(12) United States Patent
Jiang et al.

(10) Patent No.: US 9,025,025 B2
(45) Date of Patent: May 5, 2015

(54) SELF-SERVICE CLEANROOM SUIT BORROWING/RETURNING SYSTEM AND SELF-SERVICE BORROWING/RETURNING METHOD THEREOF

(75) Inventors: Yunshao Jiang, Shenzhen (CN); Chunhao Wu, Shenzhen (CN); Kunhsien Lin, Shenzhen (CN); Yongqiang Wang, Shenzhen (CN); Erqing Zhu, Shenzhen (CN); Minghu Qi, Shenzhen (CN); Xiande Li, Shenzhen (CN); Zhenhua Guo, Shenzhen (CN); Weibing Yang, Shenzhen (CN); Zenghong Chen, Shenzhen (CN)

(73) Assignee: Shenzhen China Star Optoelectronics Technology Co., Ltd, Shenzhen, Guangdong Province (CN)

( * ) Notice: Subject to any disclaimer, the term of this patent is extended or adjusted under 35 U.S.C. 154(b) by 400 days.

(21) Appl. No.: 13/515,809

(22) PCT Filed: May 4, 2012

(86) PCT No.: PCT/CN2012/075057
§ 371 (c)(1),
(2), (4) Date: Jun. 13, 2012

(87) PCT Pub. No.: WO2013/159374
PCT Pub. Date: Oct. 31, 2013

(65) Prior Publication Data
US 2013/0278762 A1 Oct. 24, 2013

(30) Foreign Application Priority Data

Apr. 24, 2012 (CN) .......................... 2012 1 0122888

(51) Int. Cl.
*H04N 7/18* (2006.01)
*G06F 7/08* (2006.01)
(Continued)

(52) U.S. Cl.
CPC ..................................... *G06Q 10/06* (2013.01)

(58) Field of Classification Search
USPC ...................................................... 348/41–161
See application file for complete search history.

(56) References Cited

U.S. PATENT DOCUMENTS 5,963,134 A * 10/1999 Bowers et al. ............. 340/572.1
7,886,971 B2 * 2/2011 Cassady et al. ................ 235/383
(Continued)

FOREIGN PATENT DOCUMENTS

CN 101064026 A 10/2007
CN 101251939 A 8/2008

*Primary Examiner* — Joseph Ustaris
*Assistant Examiner* — Talha Nawaz
(74) *Attorney, Agent, or Firm* — Cheng-Ju Chiang

(57) ABSTRACT

The present invention relates to a self-service cleanroom suit borrowing/returning system and a self-service borrowing/returning method thereof. The self-service cleanroom suit borrowing/returning system includes an automatic cleanroom suit management system backside servo, a borrowing/returning terminal, and a self-service borrowing/returning cleanroom suit machine. The borrowing/returning terminal is connected, via data communication network, to the automatic cleanroom suit management system backside servo, whereby a user uses the borrowing/returning terminal to enter information required for self-service borrowing/returning of cleanroom suit to the automatic cleanroom suit management system backside servo. The self-service borrowing/returning cleanroom suit machine includes a cleanroom suit returning box for a user to deposit a cleanroom suit and a cleanroom suit borrowing box for a user to retrieve a cleanroom suit, both of which are associated with the automatic cleanroom suit management system backside servo.

13 Claims, 3 Drawing Sheets

(51) Int. Cl.
*G05B 19/00* (2006.01)
*G06Q 10/06* (2012.01)

(56) References Cited

U.S. PATENT DOCUMENTS

| | | | |
|---|---|---|---|
| 8,479,986 B2* | 7/2013 | Chen et al. | 235/380 |
| 2002/0087413 A1* | 7/2002 | Mahaffy et al. | 705/16 |
| 2004/0158352 A1* | 8/2004 | Sheem | 700/243 |
| 2006/0114531 A1* | 6/2006 | Webb et al. | 359/15 |
| 2006/0206363 A1* | 9/2006 | Gove | 705/6 |
| 2006/0217836 A1* | 9/2006 | Poliner | 700/237 |
| 2008/0133386 A1* | 6/2008 | Darvish et al. | 705/30 |
| 2008/0164974 A1* | 7/2008 | Cochran et al. | 340/5.83 |
| 2010/0228608 A1* | 9/2010 | Hedley et al. | 705/13 |
| 2010/0234987 A1* | 9/2010 | Benschop et al. | 700/237 |
| 2011/0128381 A1* | 6/2011 | Bianco | 348/149 |
| 2012/0066638 A1* | 3/2012 | Ohri | 715/784 |
| 2013/0015240 A1* | 1/2013 | Chen et al. | 235/380 |

* cited by examiner

SELF-SERVICE CLEANROOM SUIT BORROWING/RETURNING SYSTEM AND SELF-SERVICE BORROWING/RETURNING METHOD THEREOF

BACKGROUND OF THE INVENTION

1. Field of the Invention

The present invention relates to a self-service borrowing/returning system, and in particular to a self-service cleanroom suit borrowing/returning system and a self-service borrowing/returning method thereof.

2. The Related Arts

With the development of contemporary mass production, while in the progress of improving production facility and logistic system, businesses are continuing upgrading internal rear-service system, such as automatic punch clock machine system, automatic sales machine system, and automatic value recharging machine system, in order to increase overall performance of the production system. It is well known that good tools are prerequisite to the successful execution of a job. Thus, automatic office systems would be of great help for improving employees' performances in the office and reducing waste of waiting time in a manufacture process would be helpful for improving manufacture performance of production facility. In recent decades, great progresses have been accomplished for various automatized systems. In modern large cities, self-service borrowing/returning machines are quite common and these machines provide convenience of service to general consumers in exactly the same way as automatic teller machines.

Employees of liquid crystal manufacture companies are required to wear cleanroom suits before they enter cell workshops, color film workshops, and array workshops. However, some of the employees may not have their own cleanroom suits and must borrow ones from a cleanroom suit keeping department. Each time a person wishes to borrow a cleanroom suit, he or she must first locate the cleanroom suit keeper and make a registration of borrowing before the person can get a cleanroom suit. The cleanroom suit so borrowed may not be exactly fit in size and it is may also be troublesome to exchange the unfit cleanroom suit with others. It is often that access to a cleanroom has to be done immediately but the cleanroom suit keeper cannot be timely located for borrowing a cleanroom suit and time is just elapsing. Such troubles of waiting, locating, making registration of borrowing cleanroom suit, and sometimes, exchange of borrowed cleanroom suits deteriorate performance of the employees and thus affecting the performance of the business.

FIG. 1 is a flow chart illustrating a before-improvement conventional way of cleanroom suit borrowing/returning process. With such a known cleanroom suit borrowing/returning process, the cleanroom suit keeper must be first located and the keeper may be busy or out of office, so that waiting with patience is inevitable. Secondly, related information must be filled in a registration table for borrowing cleanroom suit and this is time consuming and tedious. Thirdly, the cleanroom suit keeper has to seek for a proper set of cleanroom suit and this also takes time. In case the cleanroom suit for sought is not fit, replacement of the cleanroom can be troublesome to the cleanroom suit keeper. In addition, returning the cleanroom suit also need to go through the same process of locating the keeper and making record of the related information and then the cleanroom suit is handed to the keeper for confirmation.

On the other hand, modern technology has been gradually applied to the field of self-service borrowing/returning machine and a newly developed technique of radio frequency identification is now taking the place of long-used barcode identification technique with the unique benefits thereof. The radio frequency identification, which is commonly abbreviated as RFID, is a non-contact active identification technique that is realized with radio frequency techniques. Compared to the barcode techniques, RFID has benefits in respect of functionalities of transmissibility and obstacle-free reading, fast scanning, repeated usability, data readability/writability, as well as compact size, diverse shapes, contamination resistance, durability, great amount of data memory, and safety. Chinese Patent No. CN200610076520.6 teaches combination of RFID with robot techniques so that operations of self-service borrowing/returning, looking up, searching, and shelf arrangement can be realized with the robot thereby reducing manual operation. It is appreciated that the RFID based self-service borrowing/returning system can be expanded to applications of automatic warehousing of various goods.

SUMMARY OF THE INVENTION

Thus, an object of the present invention is to provide a self-service cleanroom suit borrowing/returning system that realizes cleanroom suit management of automatic borrowing/returning.

Another object of the present invention is to provide a self-service borrowing/returning method for self-service cleanroom suit borrowing/returning system.

To achieve the objects, the present invention provides a self-service cleanroom suit borrowing/returning system, which comprises an automatic cleanroom suit management system backside servo, a borrowing/returning terminal, and a self-service borrowing/returning cleanroom suit machine. The automatic cleanroom suit management system backside servo performs self-service borrowing/returning of cleanroom suits by applying RFID to cleanroom suits carrying electronic labels at the backside. The borrowing/returning terminal is connected, via data communication network, to the automatic cleanroom suit management system backside servo, whereby a user uses the borrowing/returning terminal to enter information required for self-service borrowing/returning of cleanroom suit to the automatic cleanroom suit management system backside servo. The self-service borrowing/returning cleanroom suit machine comprises a cleanroom suit returning box for a user to deposit a cleanroom suit and a cleanroom suit borrowing box for a user to retrieve a cleanroom suit, which are associated with the automatic cleanroom suit management system backside servo, whereby according to the operation that the user makes on the borrowing/returning terminal, the automatic cleanroom suit management system backside servo recovers the cleanroom suit from the cleanroom suit returning box or supplies the cleanroom suit to the cleanroom suit borrowing box.

Wherein, the self-service cleanroom suit borrowing/returning system further comprises a monitor system, and the monitor system comprises a monitor system backside servo and a camera that is arranged adjacent to the borrowing/returning terminal to photograph a user's operation of self-service borrowing/returning cleanroom suit. The camera is in communication with the monitor system backside servo.

Wherein, operation of the monitor system comprises real-time surveillance and taping surveillance.

Wherein, the monitor system is a centralized monitor system, which simultaneously monitors events where a plurality of users simultaneously conducts self services for borrowing or returning cleanroom suits.

Wherein, the data communication network is a cabled network or a wireless network.

Wherein, the borrowing/returning terminal comprises a computer that comprises an RFID detector. The RFID detector identifies a user's employee identification card or electronic label of a cleanroom suit.

Wherein, the computer comprises a touch screen.

Wherein, the cleanroom suit returning box of the self-service borrowing/returning cleanroom suit machine forms a cleanroom suit opening and a gate connected to the automatic cleanroom suit management system backside servo. The cleanroom suit opening is provided with a cleanroom suit receiving detection device. The cleanroom suit borrowing box of the self-service borrowing/returning cleanroom suit machine forms a cleanroom suit pickup opening and a cleanroom suit supply opening and a rear gate connected to the automatic cleanroom suit management system backside servo.

Wherein, the self-service borrowing/returning cleanroom suit machine comprises a power port and a cable port connected to the automatic cleanroom suit management system backside servo and the monitor system backside servo.

The present invention also provides a self-service borrowing/returning method of a self-service cleanroom suit borrowing/returning system. The method comprises a cleanroom suit borrowing process and a cleanroom suit returning process.

The cleanroom suit borrowing process comprises:

Step 101: a user using a borrowing/returning terminal to start a process of borrowing a cleanroom suit;

Step 102: the user using the borrowing/returning terminal to enter size of cleanroom suit;

Step 103: the borrowing/returning terminal identifying user's employee identification card; and Step 104: the automatic cleanroom suit management system backside servo supplying a cleanroom suit to the cleanroom suit borrowing box according to the entered cleanroom suit size.

The cleanroom suit returning process comprises:

Step 201: a user placing the cleanroom suit at a borrowing/returning terminal to be identified by the borrowing/returning terminal;

Step 202: the user using the borrowing/returning terminal to signal an automatic cleanroom suit management system backside servo to start returning the cleanroom suit; and Step 203: the user depositing the cleanroom suit into a cleanroom suit returning box to be collected by the automatic cleanroom suit management system backside servo.

Wherein, in Step 203, the automatic cleanroom suit management system backside servo starts an operation of collecting the cleanroom suit only when a cleanroom suit receiving detection device provided at an opening of the cleanroom suit returning box detects an object entering the cleanroom suit returning box within a predetermined period of time.

The method further comprises a step that a cleanroom suit keeper uses a monitor system to monitor the step of borrowing cleanroom suit and the step of returning the cleanroom suit can be included. The monitor system comprises a monitor system backside servo and a camera arranged adjacent to the borrowing/returning terminal to photograph a user's operation of self-service borrowing/returning cleanroom suit. The camera is in communication with the monitor system backside servo.

Wherein, the borrowing/returning terminal is connected, via data communication network, to the automatic cleanroom suit management system backside servo. The borrowing/returning terminal comprises a computer that comprises an RFID detector. The RFID detector identifies a user's employee identification card or electronic label of a cleanroom suit.

Wherein, the computer comprises at touch screen. To borrow a cleanroom suit, a user uses a touch screen to start a process of borrowing a cleanroom suit by single clicking of a cleanroom suit borrowing menu on the touch screen and the touching screen showing a list of cleanroom suit sizes, a desired size being selected on the touch screen, and then following instructions to have employee identification card read at an RFID detector to complete the process of borrowing cleanroom suit. The borrowed cleanroom suit is then supplied by the automatic cleanroom suit management system backside servo, according to the selected cleanroom suit size, to the cleanroom suit borrowing box. To return the cleanroom suit, the user places the cleanroom suit at an identification site of the RFID detector, makes a click of a cleanroom suit returning menu on the touch screen, and then deposits the cleanroom suit into the cleanroom suit returning box to be recovered by the automatic cleanroom suit management system backside servo.

The present invention provides a self-service cleanroom suit borrowing/returning system and a self-service borrowing/returning method that realize self service of borrowing/returning of cleanroom suit. The system is simple in structure and easy and efficient to use thereby achieving reduction of cost, greatly saving expense for automatizing cleanroom suit management, facilitating popularization. Using the present invention can greatly reduce the waiting time for borrowing/returning cleanroom suit, greatly simplifies the operation process, increase working efficiency, and realize automatized management of cleanroom suit.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

Figure 1:
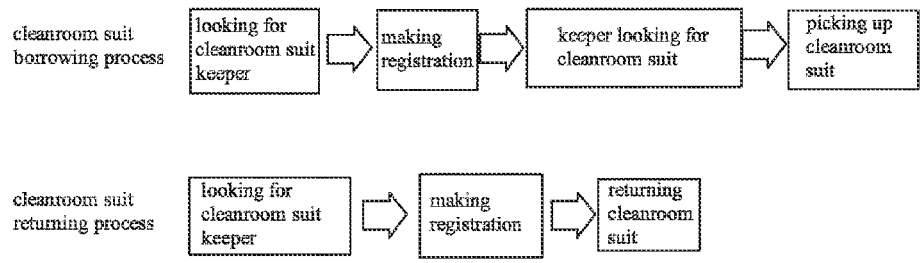
FIG. 1 is a flow chart illustrating a before-improvement conventional way of cleanroom suit borrowing/returning process.
Figure 2:
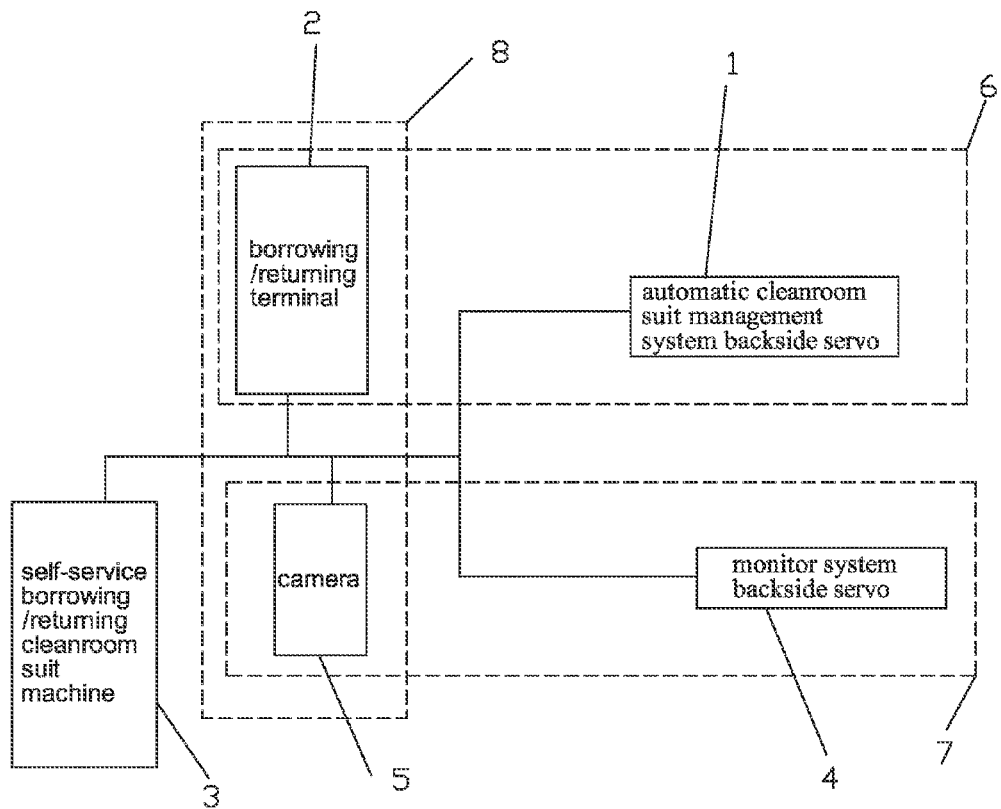
FIG. 2 is a schematic view showing a self-service cleanroom suit borrowing/returning system according to a preferred embodiment of the present invention.

Referring to FIG. 2, which is a schematic view showing a self-service cleanroom suit borrowing/returning system according to a preferred embodiment of the present invention, the self-service cleanroom suit borrowing/returning system of the present invention generally comprises an automatic cleanroom suit management system backside servo 1, a borrowing/returning terminal 2, and a self-service borrowing/ returning cleanroom suit machine 3. The automatic cleanroom suit management system backside servo 1 performs self-service borrowing/returning of cleanroom suits by applying RFID to the cleanroom suits carrying electronic labels at the backside. The automatic cleanroom suit management system backside servo 1 uses robots to carry out the self-service borrowing/returning management of cleanroom suits. The borrowing/returning terminal 2 is connected, via data communication network, to the automatic cleanroom suit management system backside servo 1, whereby a user may uses the borrowing/returning terminal 2 to enter information required for self-service borrowing/returning of cleanroom suit to the automatic cleanroom suit management system backside servo 1. The self-service borrowing/returning cleanroom suit machine 3 comprises a cleanroom suit returning box for a user to deposit a cleanroom suit and a cleanroom suit borrowing box for a user to retrieve a cleanroom suit, both of which are associated with the automatic cleanroom suit management system backside servo 1. According to the operation that the user makes on the borrowing/returning terminal 2, the automatic cleanroom suit management system backside servo 1 recovers the cleanroom suit from the cleanroom suit returning box or supplies the cleanroom suit to the cleanroom suit borrowing box. The data communication network can be a wired network or a wireless network. The borrowing/returning terminal 2 can comprise a computer that comprises an RFID detector. The RFID detector identifies a user's employee identification card or the electronic label of a cleanroom suit in order to determine if the user has the privilege or if the cleanroom suit meets requirements.

In the preferred embodiment, the self-service cleanroom suit borrowing/returning system further comprises a monitor system backside servo 4 and a camera 5. Division can be made according to functional blocks, wherein the automatic cleanroom suit management system backside servo 1 and the borrowing/returning terminal 2 constitute an automatic cleanroom suit management system 6 and the monitor system backside servo 4 and the camera 5 constitute a monitor system 7. The camera 5 is arranged adjacent to the borrowing/returning terminal 2 to photograph a user's operation of self-service borrowing/returning cleanroom suit. The camera 5 is in communication with the monitor system backside servo 4. The present invention provides the borrowing/returning terminal 2 and the camera 5 to collectively constitute a self-service borrowing/returning terminal 8 for realizing self-service borrowing/returning of the cleanroom suits. The operation of the monitor system 7 comprises real-time surveillance and taping surveillance and this allows service to be provided to the employees during the noon break when the cleanroom suit keeper might be absent for a short while. The monitor system 7 is a centralized monitor system, which simultaneously monitors the events where a plurality of users simultaneously conduct self services for borrowing or returning cleanroom suits, and thus, versatile applications can be realized for management of cleanroom suits. The company employees may use the automatic cleanroom suit management system 6 to effect self-service for borrowing and returning cleanroom suits and management of cleanroom suit monitor the process through the monitor system 7. Thus, by means of the RFID based cleanroom self-service cleanroom suit borrowing/returning system, company employees' self-service of borrowing and returning cleanroom suits and cleanroom suit keeper's efficient inventory checking can both be realized.

Figure 3:
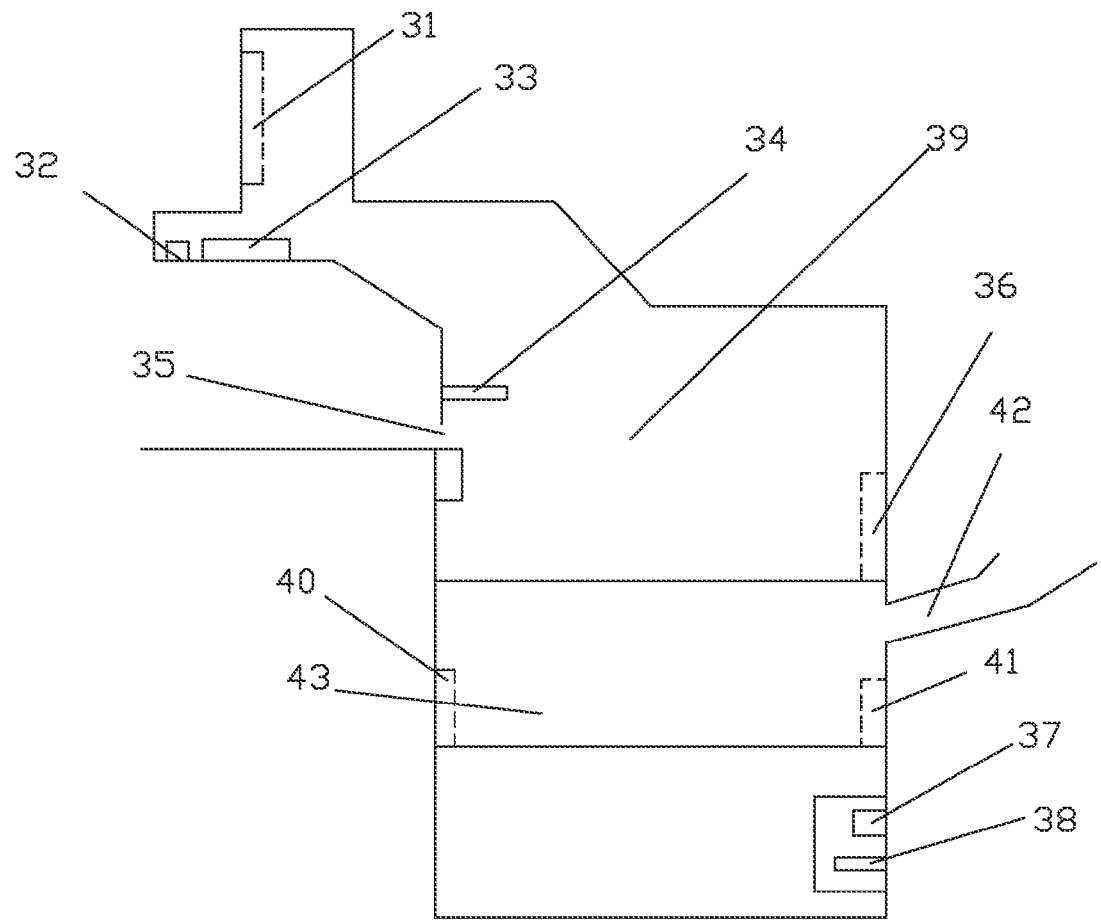
FIG. 3 is a schematic view showing structure of a the self-service borrowing/returning cleanroom suit machine of a preferred embodiment of the self-service cleanroom suit borrowing/returning system according to the present invention.

Referring to FIG. 3, a schematic view showing structure of a the self-service borrowing/returning cleanroom suit machine of a preferred embodiment of the self-service cleanroom suit borrowing/returning system according to the present invention is given. In the preferred embodiment, the self-service borrowing/returning cleanroom suit machine 3 is a three-dimensional structure. It is known, in combination with FIG. 2, that the self-service borrowing/returning cleanroom suit machine 3 integrates together the functions of the borrowing/returning terminal 2 and the camera 5. The self-service borrowing/returning cleanroom suit machine 3 comprises a display 31, a camera 32 in a unitary form, an RFID detector 33, a cleanroom suit returning box 39 at a central portion, and a cleanroom suit borrowing box 43 at a bottom portion. The camera 32 is the camera 5 shown in FIG. 2 and constituting the monitor system 7. The display 31 and the RFID detector 33 are the borrowing/returning terminal 2 of FIG. 2. The display 31 can be a touch screen, which provides a computer graphics interface (CGI) to a user. The cleanroom suit returning box 39 also comprises a cleanroom suit opening 35 and a gate 36. The cleanroom suit opening 35 allows a user to drop in a cleanroom suit. The gate 36 is connected to the automatic cleanroom suit management system backside servo 1 and the gate 36 is provided with a lock. The cleanroom suit opening 35 is provided with a cleanroom suit receiving detection device 34. The cleanroom suit borrowing box forms a cleanroom suit pickup opening 40, a cleanroom suit supply opening 42, and a rear gate 41. The cleanroom suit pickup opening 40 allows a user to pick up a cleanroom suit. The cleanroom suit supply opening 42 and the rear gate 41 are connected to the automatic cleanroom suit management system backside servo 1. The self-service borrowing/returning cleanroom suit machine 3 further comprises a power port 37 and a cable port 38 connected to the automatic cleanroom suit management system backside servo 1 and the monitor system backside servo 4.

Figure 4:
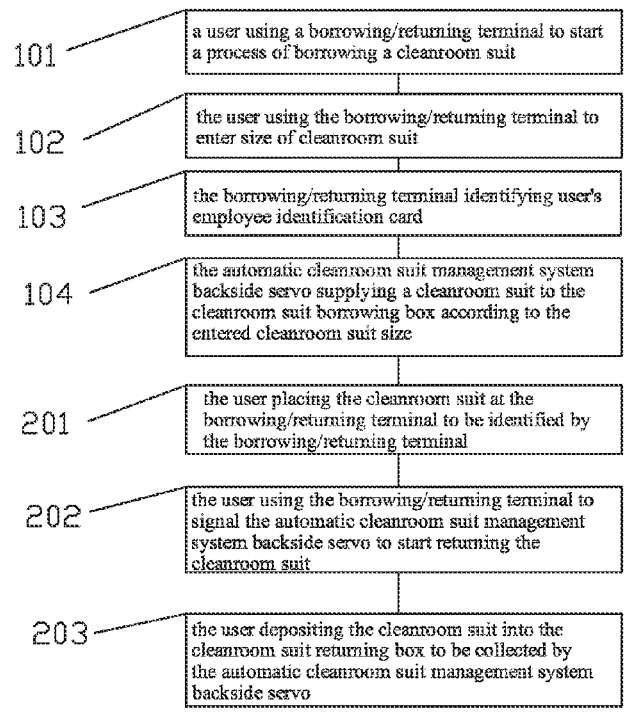
FIG. 4 is a flow chart illustrating a self-service borrowing/returning method of the self-service cleanroom suit borrowing/returning system according to the present invention.

Referring to FIG. 4, a flow chart illustrating a self-service borrowing/returning method of the self-service cleanroom suit borrowing/returning system according to the present invention is given, which comprises: Step 101, a user using a borrowing/returning terminal to start a process of borrowing a cleanroom suit; Step 102, the user using the borrowing/returning terminal to enter size of cleanroom suit; Step 103, the borrowing/returning terminal identifying user's employee identification card; Step 104, the automatic cleanroom suit management system backside servo supplying a cleanroom suit to the cleanroom suit borrowing box according to the entered cleanroom suit size; Step 201, the user placing the cleanroom suit at the borrowing/returning terminal to be identified by the borrowing/returning terminal; Step 202, the user using the borrowing/returning terminal to signal the automatic cleanroom suit management system backside servo to start returning the cleanroom suit; and Step 203, the user depositing the cleanroom suit into the cleanroom suit returning box to be collected by the automatic cleanroom suit management system backside servo. Further, a step that a cleanroom suit keeper uses the monitor system to monitor the step of borrowing cleanroom suit and the step of returning the cleanroom suit can be included. The monitor system comprises a monitor system backside servo and a camera arranged adjacent to the borrowing/returning terminal to photograph a user's operation of self-service borrowing/returning cleanroom suit. The camera is in communication with the monitor system backside servo. The process of borrowing and returning cleanroom suit is monitored by the monitor system in order to realize self-service of borrowing and returning. The operation of the monitor system 7 comprises real-time surveillance and taping surveillance and this allows service to be provided to the employees during the noon break when the cleanroom suit keeper might be absent for a short while. The monitor system 7 is a centralized monitor system, which monitors the events where a plurality of users simultaneously conduct self services for borrowing or returning cleanroom suits, and thus, versatile applications can be realized for management of cleanroom suits.

Figure 5:
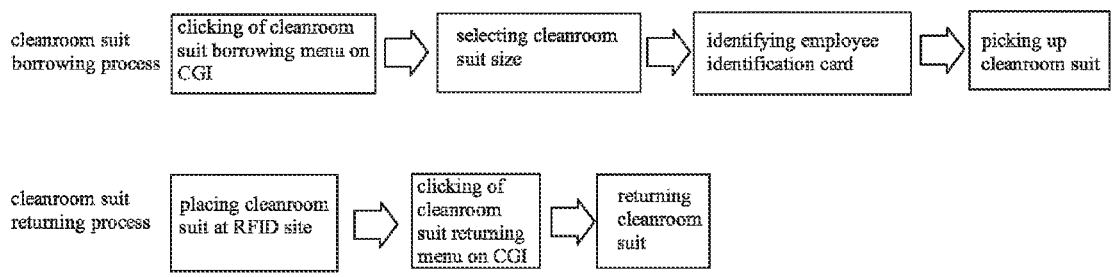
FIG. 5 is a flow chart illustrating a self-service borrowing/returning process of the self-service borrowing/returning method according to a preferred embodiment of the present invention.

FIG. 5 is a flow chart illustrating a self-service borrowing/returning process of the self-service borrowing/returning method according to a preferred embodiment of the present invention. Referring collectively to FIGS. 3, 4, and 5, an explanation of a process of self-service borrowing/returning cleanroom suit by using the self-service borrowing/returning cleanroom suit machine 3 is given. A user uses a display (preferably a touch screen) of the self-service borrowing/returning cleanroom suit machine 3 to start a process of borrowing a cleanroom suit by single clicking of a cleanroom suit borrowing menu and the touching screen showing a list of cleanroom suit sizes, followed by selecting a desired size on the touch screen, and then having card read at RFID detector 33 by properly following instruction, thereby completing the process of borrowing cleanroom suit. The borrowed cleanroom suit is then supplied by the automatic cleanroom suit management system 6, according to the entered size of the cleanroom suit, through the cleanroom suit supply opening 42 to the cleanroom suit borrowing box 43. In case a user uses the RFID detector 33 to conduct returning of cleanroom suit, the cleanroom suit returning operation can only be completed in the automatic cleanroom suit management system 6 by an object being detected by the cleanroom suit receiving detection device 34 to enter the cleanroom suit returning box 39 within a limited time period after the RFID detector 33 is activated for returning of cleanroom suit.

According to the borrowing/returning method provided by the present invention, borrowing/returning cleanroom suit comprises a user placing a cleanroom suit at a designated location for borrowing/returning cleanroom suit and reminder notes are provided at the designated location for borrowing/returning cleanroom suit. According to the borrowing/returning method of the present invention, the entrance of a cleanroom is posted with notes for borrowing/returning cleanroom suit and these notes include after an operation of self service of returning cleanroom suit, the cleanroom suit must be immediately placed at the designated location for returning cleanroom suit. This method is generally applied to a cleanroom and uses an automatized management system of the cleanroom (comprising backside servo and a borrowing/returning terminal to be used by a cleanroom managing staff) to provide self service operation to the cleanroom operators and is used in combination with a monitor system to realize self service operation of returning or borrowing cleanroom suit.

With the self-service borrowing/returning method according to the present invention being applied to improve the process of borrowing/returning cleanroom suit, borrowing a cleanroom suit can be done without first looking for the cleanroom suit keeper and requires only conducting click of the cleanroom suit borrowing menu on the self-service borrowing/returning touch screen. After the click of the cleanroom suit borrowing menu, the screen shows up sizes of cleanroom suit and selection of a desired size can then be made, followed by having employee's identification card read and confirmed to complete the process of borrowing cleanroom suit. Returning a cleanroom suit can also be done without the cleanroom suit keeper by simply placing the cleanroom suit on the RFID window and then conducting click of a cleanroom suit returning menu to complete the process of returning cleanroom suit. In the view points of both operating flow and waiting time, the improved process provides a great saving of time as compared to the conventional process and the process is simplified, allowing the operation to be easy to carry out and allowing the employees to fast enter the workshop thereby improving working efficiency and providing the employees with more time to work and creating more values for the business.

In summary, the present invention provides a self-service cleanroom suit borrowing/returning system and a self-service borrowing/returning method that realize self service of borrowing/returning of cleanroom suit. The system is simple in structure and easy and efficient to use thereby achieving reduction of cost, greatly saving expense for automatizing cleanroom suit management, facilitating popularization. Using the present invention can greatly reduce the waiting time for borrowing/returning cleanroom suit, greatly simplifies the operation process, increase working efficiency, and realize automatized management of cleanroom suit.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A self-service cleanroom suit borrowing/returning system, comprising an automatic cleanroom suit management system backside servo, a borrowing/returning terminal, a self-service borrowing/returning cleanroom suit machine, and a monitor system, the automatic cleanroom suit management system backside servo performing self-service borrowing/returning of cleanroom suits by applying radio-frequency identification (RFID) to cleanroom suits carrying electronic labels at the backside, the borrowing/returning terminal being connected, via data communication network, to the automatic cleanroom suit management system backside servo, whereby a user uses the borrowing/returning terminal to enter information required for self-service borrowing/returning of cleanroom suit to the automatic cleanroom suit management system backside servo, the self-service borrowing/returning cleanroom suit machine comprising a cleanroom suit returning box for a user to deposit a cleanroom suit and a cleanroom suit borrowing box for a user to retrieve a cleanroom suit, which are associated with the automatic cleanroom suit management system backside servo, whereby according to the operation that the user makes on the borrowing/returning terminal, the automatic cleanroom suit management system backside servo recovers the cleanroom suit from the cleanroom suit returning box or supplies the cleanroom suit to the cleanroom suit borrowing box;

wherein the monitor system comprises a monitor system backside servo and a camera that is arranged adjacent to the borrowing/returning terminal to photograph a user's operation of self-service borrowing/returning cleanroom suit, the camera being in communication with the monitor system backside servo; and wherein the monitor system is a centralized monitor system, which simultaneously monitors events where a plurality of users simultaneously conducts self services for borrowing or returning cleanroom suits.

2. The self-service cleanroom suit borrowing/returning system as claimed in claim 1, wherein operation of the monitor system comprises real-time surveillance and taping surveillance.

3. The self-service cleanroom suit borrowing/returning system as claimed in claim 1, wherein the data communication network is a cabled network or a wireless network.

4. The self-service cleanroom suit borrowing/returning system as claimed in claim 1, wherein the borrowing/returning terminal comprises a computer that comprises an RFID detector, the RFID detector identifying a user's employee identification card or electronic label of a cleanroom suit.

5. The self-service cleanroom suit borrowing/returning system as claimed in claim 4, wherein the computer comprises a touch screen.

6. The self-service cleanroom suit borrowing/returning system as claimed in claim 1, wherein the cleanroom suit returning box of the self-service borrowing/returning cleanroom suit machine forms a cleanroom suit opening and a gate connected to the automatic cleanroom suit management system backside servo, the cleanroom suit opening being provided with a cleanroom suit receiving detection device, the cleanroom suit borrowing box of the self-service borrowing/returning cleanroom suit machine forming a cleanroom suit pickup opening and a cleanroom suit supply opening and a rear gate connected to the automatic cleanroom suit management system backside servo.

7. The self-service cleanroom suit borrowing/returning system as claimed in claim 1, wherein the self-service borrowing/returning cleanroom suit machine comprises a power port and a cable port connected to the automatic cleanroom suit management system backside servo and the monitor system backside servo.

8. A self-service cleanroom suit borrowing/returning system, comprising an automatic cleanroom suit management system backside servo, a borrowing/returning terminal, and a self-service borrowing/returning cleanroom suit machine, the automatic cleanroom suit management system backside servo performing self-service borrowing/returning of cleanroom suits by applying radio-frequency identification (RFID) to cleanroom suits carrying electronic labels at the backside, the borrowing/returning terminal being connected, via data communication network, to the automatic cleanroom suit management system backside servo, whereby a user uses the borrowing/returning terminal to enter information required for self-service borrowing/returning of cleanroom suit to the automatic cleanroom suit management system backside servo, the self-service borrowing/returning cleanroom suit machine comprising a cleanroom suit returning box for a user to deposit a cleanroom suit and a cleanroom suit borrowing box for a user to retrieve a cleanroom suit, which are associated with the automatic cleanroom suit management system backside servo, whereby according to the operation that the user makes on the borrowing/returning terminal, the automatic cleanroom suit management system backside servo recovers the cleanroom suit from the cleanroom suit returning box or supplies the cleanroom suit to the cleanroom suit borrowing box;

wherein the self-service cleanroom suit borrowing/returning system further comprises a monitor system, the monitor system comprising a monitor system backside servo and a camera that is arranged adjacent to the borrowing/returning terminal to photograph a user's operation of self-service borrowing/returning cleanroom suit, the camera being in communication with the monitor system backside servo;

wherein operation of the monitor system comprises real-time surveillance and taping surveillance;

wherein the monitor system is a centralized monitor system, which simultaneously monitors events where a plurality of users simultaneously conducts self services for borrowing or returning cleanroom suits;

wherein the data communication network is a cabled network or a wireless network;

wherein the borrowing/returning terminal comprises a computer that comprises an RFID detector, the RFID detector identifying a user's employee identification card or electronic label of a cleanroom suit;

wherein the computer comprises a touch screen;

wherein the cleanroom suit returning box of the self-service borrowing/returning cleanroom suit machine forms a cleanroom suit opening and a gate connected to the automatic cleanroom suit management system backside servo, the cleanroom suit opening being provided with a cleanroom suit receiving detection device, the cleanroom suit borrowing box of the self-service borrowing/returning cleanroom suit machine forming a cleanroom suit pickup opening and a cleanroom suit supply opening and a rear gate connected to the automatic cleanroom suit management system backside servo; and wherein the self-service borrowing/returning cleanroom suit machine comprises a power port and a cable port connected to the automatic cleanroom suit management system backside servo and the monitor system backside servo.

9. A self-service borrowing/returning method for use with a self-service cleanroom suit borrowing/returning system which comprises an automatic cleanroom suit management system backside servo, a borrowing/returning terminal, and a self-service borrowing/returning cleanroom suit machine, the automatic cleanroom suit management system backside servo performing self-service borrowing/returning of cleanroom suits by applying radio-frequency identification (RFID) to cleanroom suits carrying electronic labels at the backside, the borrowing/returning terminal being connected, via data communication network, to the automatic cleanroom suit management system backside servo, whereby a user uses the borrowing/returning terminal to enter information required for self-service borrowing/returning of cleanroom suit to the automatic cleanroom suit management system backside servo, the self-service borrowing/returning cleanroom suit machine comprising a cleanroom suit returning box for a user to deposit a cleanroom suit and a cleanroom suit borrowing box for a user to retrieve a cleanroom suit, which are associated with the automatic cleanroom suit management system backside servo, whereby according to the operation that the user makes on the borrowing/returning terminal, the automatic cleanroom suit management system backside servo recovers the cleanroom suit from the cleanroom suit returning box or supplies the cleanroom suit to the cleanroom suit borrowing box, the method comprising a cleanroom suit borrowing process and a cleanroom suit returning process, wherein:

the cleanroom suit borrowing process comprises:

Step 101: a user using a borrowing/returning terminal to start a process of borrowing a cleanroom suit;

Step 102: the user using the borrowing/returning terminal to enter a size of a cleanroom suit;

Step 103: the borrowing/returning terminal identifying user's employee identification card; and Step 104: the automatic cleanroom suit management system backside servo supplying a cleanroom suit to the cleanroom suit borrowing box according to the entered cleanroom suit size; and the cleanroom suit returning process comprises:

Step 201: a user placing the cleanroom suit at a borrowing/returning terminal to be identified by the borrowing/returning terminal;

Step 202: the user using the borrowing/returning terminal to signal an automatic cleanroom suit management system backside servo to start returning the cleanroom suit; and Step 203: the user depositing the cleanroom suit into a cleanroom suit returning box to be collected by the automatic cleanroom suit management system backside servo.

10. The self-service borrowing/returning method as claimed in claim 9, wherein in Step 203, the automatic cleanroom suit management system backside servo starts an operation of collecting the cleanroom suit only when a cleanroom suit receiving detection device provided at an opening of the cleanroom suit returning box detects an object entering the cleanroom suit returning box within a predetermined period of time.

11. The self-service borrowing/returning method as claimed in claim 9 further comprising a step that a cleanroom suit keeper uses a monitor system to monitor the step of borrowing cleanroom suit and the step of returning the cleanroom suit can be included, the monitor system comprising a monitor system backside servo and a camera arranged adjacent to the borrowing/returning terminal to photograph a user's operation of self-service borrowing/returning cleanroom suit, the camera being in communication with the monitor system backside servo.

12. The self-service borrowing/returning method as claimed in claim 9, wherein the borrowing/returning terminal is connected, via data communication network, to the automatic cleanroom suit management system backside servo, the borrowing/returning terminal comprising a computer that comprises an RFID detector, the RFID detector identifying a user's employee identification card or electronic label of a cleanroom suit.

13. The self-service borrowing/returning method as claimed in claim 12, wherein the computer comprises a touch screen; to borrow a cleanroom suit, a user uses the touch screen to start a process of borrowing a cleanroom suit by single clicking of a cleanroom suit borrowing menu on the touch screen and the touching screen showing a list of cleanroom suit sizes, a desired size being selected on the touch screen, and then following instructions to have employee identification card read at the RFID detector to complete the process of borrowing cleanroom suit, the borrowed cleanroom suit being then supplied by the automatic cleanroom suit management system backside servo, according to the selected cleanroom suit size, to the cleanroom suit borrowing box; to return the cleanroom suit, the user places the cleanroom suit at an identification site of the RFID detector, makes a click of a cleanroom suit returning menu on the touch screen, and then despite the cleanroom suit into the cleanroom suit returning box to be recovered by the automatic cleanroom suit management system backside servo.

* * * * *